(12) United States Patent
Lehman

(10) Patent No.: US 8,701,989 B2
(45) Date of Patent: Apr. 22, 2014

(54) METHODS AND SYSTEMS FOR DISPLAYING LOYALTY PROGRAM INFORMATION ON A PAYMENT CARD

(71) Applicant: MasterCard International Incorporated, Purchase, NY (US)

(72) Inventor: Garrett Delos Lehman, Arnold, MO (US)

(73) Assignee: MasterCard International Incorporated, Purchase, NY (US)

(*) Notice: Subject to any disclaimer, the term of this patent is extended or adjusted under 35 U.S.C. 154(b) by 7 days.

(21) Appl. No.: 13/661,544

(22) Filed: Oct. 26, 2012

(65) Prior Publication Data

US 2013/0054340 A1 Feb. 28, 2013

Related U.S. Application Data

(63) Continuation of application No. 12/565,558, filed on Sep. 23, 2009, now Pat. No. 8,317,094.

(51) Int. Cl.
*G06K 5/00* (2006.01)

(52) U.S. Cl.
USPC .................... 235/380; 235/379; 235/487

(58) Field of Classification Search
USPC ............... 235/375, 379, 380, 382, 487, 494
See application file for complete search history.

(56) References Cited

U.S. PATENT DOCUMENTS

| | | |
|---|---|---|
| 5,055,662 A | 10/1991 | Hasegawa |
| 5,359,183 A | 10/1994 | Skodlar |
| 5,693,956 A | 12/1997 | Shi et al. |
| 5,932,869 A | 8/1999 | Gottlich et al. |
| 6,024,288 A | 2/2000 | Gottlich et al. |
| 6,068,183 A | 5/2000 | Freeman et al. |
| 6,402,039 B1 | 6/2002 | Freeman et al. |
| 7,086,584 B2 | 8/2006 | Stoutenburg et al. |
| 7,385,508 B1 | 6/2008 | Ray et al. |
| 7,440,771 B2 | 10/2008 | Purk |
| 8,317,094 B2 * | 11/2012 | Lehman ........................ 235/380 |
| 2005/0068190 A1 | 3/2005 | Krause |
| 2006/0027647 A1 | 2/2006 | Deane et al. |

(Continued)

FOREIGN PATENT DOCUMENTS

WO     2008052073 A2     5/2008

OTHER PUBLICATIONS

"ID Card Carries OLED Display"; http://www.ubergizmo.com/15/archives/2009/03id_cad_carries_oled_display.html; posted on Mar. 5, 2009; 2 pages.

(Continued)

*Primary Examiner* — Karl D Frech
(74) *Attorney, Agent, or Firm* — Armstrong Teasdale LLP

(57) ABSTRACT

A method for displaying loyalty program information on a payment card is described. The payment card includes a processing device coupled to at least one display screen. The method includes receiving a loyalty program request message at a payment network wherein the loyalty program request message includes payment card identification data associated with the payment card, determining that the payment card is registered in a loyalty program based at least in part on the payment card identification data, electronically generating a loyalty program response message that includes loyalty program update data, and transmitting the loyalty program update data from the payment network to the payment card for displaying as loyalty program information on the at least one display screen.

20 Claims, 9 Drawing Sheets

(56) References Cited

U.S. PATENT DOCUMENTS

| | | |
|---|---|---|
| 2007/0045399 A1 | 3/2007 | Martin |
| 2007/0205290 A1 | 9/2007 | Newbrough et al. |
| 2008/0217396 A1 | 9/2008 | Boalt |
| 2008/0222047 A1 | 9/2008 | Boalt |
| 2008/0230614 A1 | 9/2008 | Boalt |
| 2008/0313720 A1 | 12/2008 | Boalt |
| 2009/0021678 A1 | 1/2009 | Son et al. |
| 2009/0159700 A1 | 6/2009 | Mullen et al. |
| 2009/0289936 A1 | 11/2009 | Sheedy et al. |

OTHER PUBLICATIONS

Martyn Williams; "Fujitsu Shows Flexible LCD"; http://www.pcworld.com/printable/article/id,121828/printable.html; IDG News Service, Jul. 14, 2005; copyright 1998-2009 PC World Communications, Inc., pp. 1-2.

Agam Shah; "Visa Toys With Credit Card Displays"; http://www.pcworld.com/printable/article/id,115910/printable.html; IDG News Service, Apr. 29, 2004, copyright 1998-2009 PC World Communications, Inc., pp. 1-3.

"Wrist-worn Flexible OLED prototype"; http//www.slipperybrick.com/2009/01/wrist-worn-flexible-oled-prototype/; Jan. 6, 2009; 2 pages.

"Credit Cards to Get Built-In LCD Display and Keypad"; GEARLOG A Gadget Guide by Geeks, for Geeks, http://www.gearlob.com/2008/11/credit_cards_to_get_built-in_lcd_display_and_keypad.php, Nov. 17, 2008; copyright 1996-2009 Ziff Davis Publishing Holdings Inc., 1 page.

OLED-Info.com; http://www.oled-info.com/design_sketches/securecard_credit_card; Nov. 21, 2006, pp. 1-2.

PCT/US2010049955 International Search Report and Written Opinion; Dec. 3, 2010; 10 pages.

\* cited by examiner

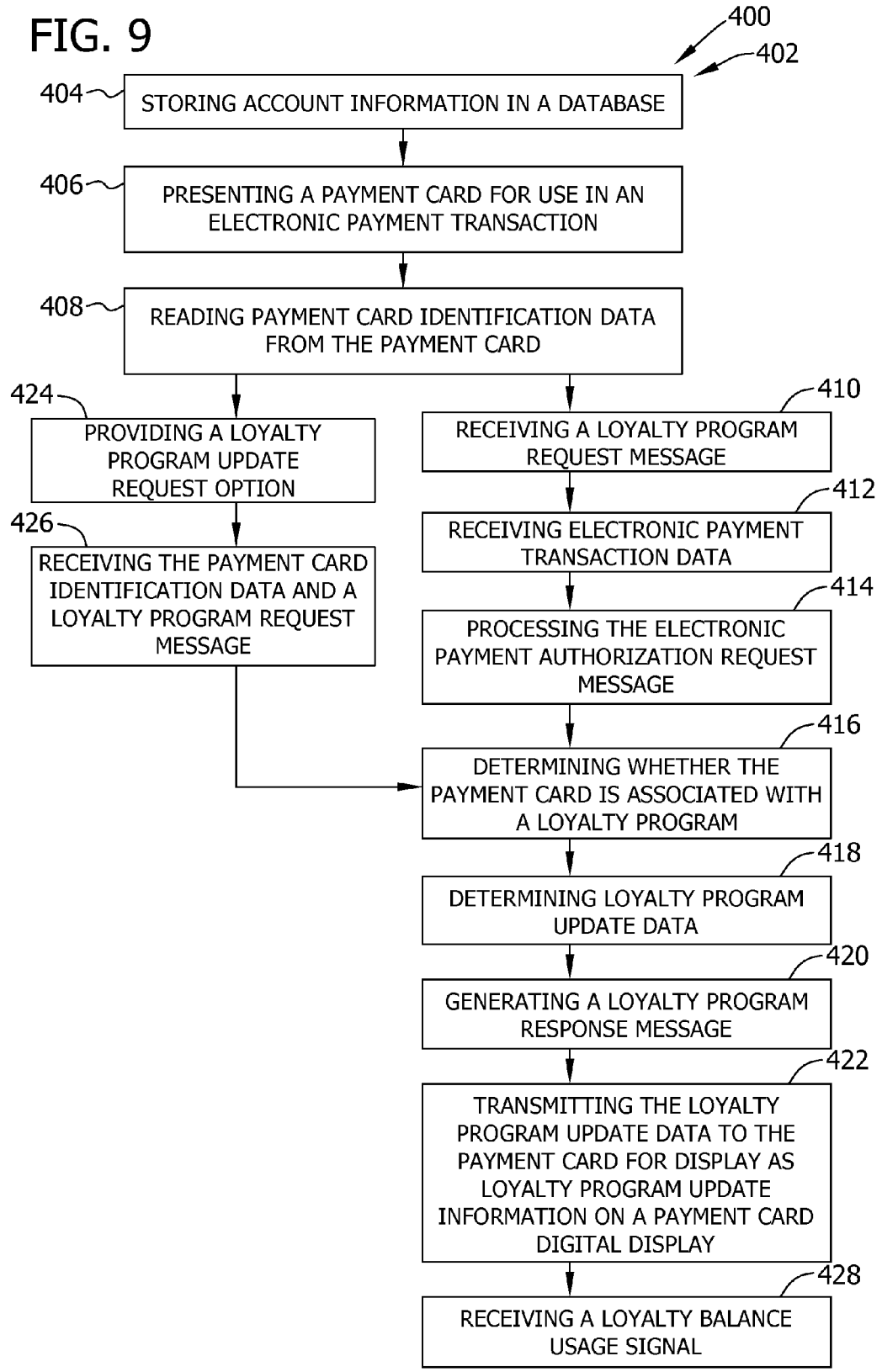

METHODS AND SYSTEMS FOR DISPLAYING LOYALTY PROGRAM INFORMATION ON A PAYMENT CARD

CROSS REFERENCE TO RELATED APPLICATIONS

This application is a continuation application of U.S. patent application Ser. No. 12/565,558, filed Sep. 23, 2009, entitled "METHODS AND SYSTEMS FOR DISPLAYING LOYALTY PROGRAM INFORMATION ON A PAYMENT CARD", the disclosure of which is hereby incorporated herein by reference in its entirety.

BACKGROUND OF THE INVENTION

The field of the present disclosure relates generally to the use of payment cards by consumers or cardholders in the payments industry, and more particularly, to a payment card configured to receive and display loyalty program information on the payment card as part of an electronic payment transaction.

At least some known merchants accept electronic payment transactions as an alternative to cash for the payment for goods and services. In such electronic payment transactions, a payment card may be used. Examples of payment cards include credit cards, debit cards, charge cards, store-value cards, gift cards, and pre-paid cards, as well as other types of cards. Payment cards are uniquely tied to a consumer or cardholder account that is backed by a card-issuing lending institution or bank. These lending institutions may have loyalty programs that provide incentives to consumers or cardholders. These incentives are intended to improve revenue and profitability for lending institutions by giving their customers a reason to use their payment cards more frequently. With more transactions being processed, there is a greater chance for increased revenue for the issuer.

Loyalty programs typically consist of paying a percentage of a qualified sale back to the consumer or cardholder in the form of cash or non-cash units that are accumulated within each consumer's or cardholder's account. Consumers or cardholders can eventually redeem these incentives or may automatically receive a loyalty program reward, for example, as a credit on their cardholder account or through issuance of a separate pre-paid card to the cardholder. Examples of incentives include cash, points, airline miles, gift certificates, coupons, etc. that accrue on the consumer's or cardholder's account. Although loyalty programs themselves are designed to attract consumers to a specific payment card program, due to the wide variety of loyalty programs designed to attract consumers to a specific payment card program, additional incentives and/or features are desired in order to attract consumers to a payment card program and to maintain their usage of the payment card.

The ability to track and use these incentives is beneficial to the cardholder. For example, it is beneficial to a cardholder to be able to track and use points they have accumulated as part of their payment card usage. It would be beneficial to the cardholder to have a payment card configured to display the points, or other incentives, on a face of the payment card so that the cardholder knows how many points they have for usage with a payment transaction.

BRIEF DESCRIPTION OF THE INVENTION

In one aspect, a method for displaying loyalty program information on a payment card using a computer coupled to a database is provided. The payment card includes a processing device coupled to a display screen. The method includes receiving, at the computer, a loyalty program request message that includes payment card identification data. The payment card identification data is associated with the payment card. The method also includes determining that the payment card is registered in a loyalty program based on the payment card identification data and cardholder account data stored in the database. The method also includes electronically generating a loyalty program response message that includes loyalty program update data. The method further includes transmitting the loyalty program update data from the computer to the payment card for displaying as loyalty program information on the display screen.

In another aspect, a network-based system for displaying loyalty program information on a payment card is provided. The system includes a computer system, a point-of-interaction (POI) device communicatively coupled to the computer system, and a payment card. The payment card is configured to transmit data to the computer system and to receive data from the computer system via the POI device. The payment card includes a display screen and a payment card communication device each coupled to a processing device. The display screen is configured to display loyalty program information.

In yet another aspect, a payment card for use in an electronic payment transaction is provided. The payment card includes a display screen, a processing device coupled to the display screen, and a wireless communication device coupled to the processing device. The wireless communication device is configured to transmit payment card identification data and to receive loyalty program update data. The loyalty program update data is output from the processing device for display on the display screen.

In yet another aspect, a method for displaying loyalty program reward information on a payment card issued to a cardholder is provided. The method is performed using a computer coupled to a database and in communication with a point-of-service (POS) terminal. The payment card includes a display and stores payment card identification data. The method comprises displaying a loyalty program update request option on the POS terminal, and receiving at the computer the payment card identification data and a loyalty program update request from the POS terminal, upon selection of the loyalty program update request option. The method further includes determining by the computer a quantity of reward points accumulated by the cardholder based on the received payment card identification data, and transmitting reward points data for the cardholder to the POS terminal for displaying the quantity of reward points accumulated by the cardholder on the payment card display.

BRIEF DESCRIPTION OF THE DRAWINGS

FIGS. 1-9 show exemplary embodiments of the methods and systems described herein.

FIG. 1 is a schematic diagram illustrating an exemplary payment card authorization system that includes a point of interaction controlled by a merchant, a card issuer or issuing bank, and a transaction processor interconnecting the point of interaction and the card issuer;

FIG. 2 is a schematic diagram illustrating an exemplary multi-party payment card industry system for enabling ordinary payment-by-card transactions in which merchants and card issuers do not necessarily have a one-on-one relationship;

FIG. 3 is a simplified block diagram of an exemplary computer system for processing payment-by-card transactions in accordance with one embodiment of the present invention;

FIG. 4 is an expanded block diagram of an exemplary embodiment of a server architecture of a computer system for processing payment-by-card transactions in accordance with one embodiment of the present invention;

FIG. 5 illustrates an exemplary configuration of a client system shown in FIGS. 3 and 4;

FIG. 6 illustrates an exemplary configuration of a server system shown in FIGS. 3 and 4;

FIG. 7 is an illustration of an exemplary payment card configured to display loyalty program data that may be used as part of the system illustrated in FIG. 3;

FIG. 8 is a data flow diagram illustrating data communication between the payment card shown in FIG. 7 and the point-of-sale terminal shown in FIGS. 1 and 2; and FIG. 9 is a flow diagram illustrating an exemplary method for displaying loyalty program information on the payment card.

DETAILED DESCRIPTION OF THE INVENTION

The following detailed description illustrates embodiments of the invention by way of example and not by way of limitation. It is contemplated that the invention has general application to processing financial transaction data by a third party in industrial, commercial, and residential applications.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Figure 1:
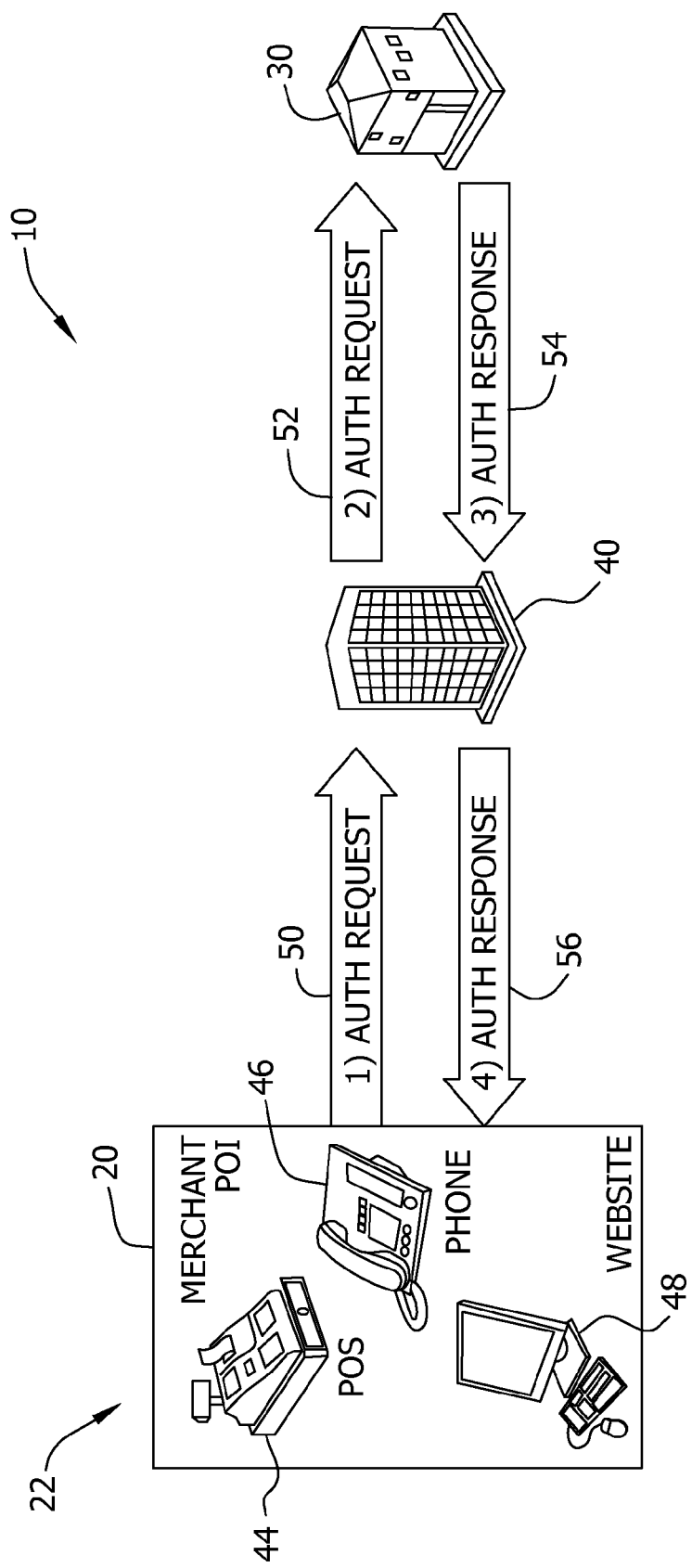

FIG. 1 is a schematic diagram of an exemplary payment card authorization system 10 that includes a point-of-interaction (POI) 20 controlled by a merchant 22, a card issuer or issuing bank 30, and a transaction processor 40 interconnecting POI 20 and card issuer 30. The merchant's POI 20 generally includes one or more of a point-of-sale (POS) terminal 44, a telephone 46, and/or a merchant website 48, through which electronic payment authorization requests are initiated. In the exemplary embodiment, issuing bank 30 includes a database (not shown in FIG. 1) for storing account information. As described above, each issued payment card is associated with a cardholder account. Cardholder account data is stored in the database and accessed when a cardholder presents a payment card in order to complete a transaction.

More specifically, in an exemplary embodiment, a merchant authorization request message 50 is generated at the merchant's POI 20 which is sent to the transaction processor 40 and forwarded to the card issuer 30 as an authorization request message 52. Upon verifying a status of the cardholder account, the card issuer 30 responds to the transaction processor 40 with an authorization response message 54 which is received by the transaction processor 40 and forwarded to the merchant's POI 20 as an authorization response message 56 to the merchant 22.

In regard to the payment card authorization system 10, a cardholder's account number is entered into the merchant's environment with which the cardholder is doing business via merchant POI 20, in order to obtain authorization response message 56. As described above, this conventionally includes one or more of the cardholder giving his payment card to a merchant to swipe or key into the merchant POS terminal 44, the cardholder or merchant initiating a phone call from telephone 46 to enter a card account number, the cardholder himself swiping his card in the merchant's POS terminal 44, or the merchant or cardholder entering the account number associated with the financial transaction card into the merchant's website 48. Payments for approved transactions are managed with the card issuer 30 or merchant's acquirer (not shown in FIG. 1) based on the specific card payment network or other closed loop environment. In the exemplary embodiment, payment card authorization system 10 generally includes POI 20, card issuer 30, and transaction processor 40 in a closed communication network such that authorization request messages 50 and 52 remain within payment card authorization system 10 and authorization response messages 54 and 56 also remain within payment card authorization system 10.

In the exemplary embodiment, payment card authorization system 10 may also utilize a payment card configured to provide payment card data to POS terminal 44 through use of a wireless system. The wireless system may include, but is not limited to, a radio frequency identification (RFID) system, a cellular communication system, a Bluetooth® communication system, a near-field communication system, or any other suitable wireless communication system that allows payment card authorization system 10 to function as described herein. (Bluetooth is a trademark of Bluetooth SIG, Inc. of Bellevue, Wash., U.S.A.). For example, the RFID system may include an RFID device within the payment card and an RFID reader positioned within POS terminal 44. In this embodiment, the payment card wirelessly transmits payment card data to POS terminal 44 in order to initiate the payment transaction.

Payment card authorization system 10 may utilize a variety of different types of payment cards offered as payment by the customer. Payment cards, also referred to herein as financial transaction cards, can refer to, for example, credit cards, debit cards, and prepaid cards. These cards can all be used as a method of payment for performing a transaction. As described herein, the term "financial transaction card" or "payment card" includes cards such as credit cards, debit cards, and prepaid cards, but also includes any other devices that may hold payment account information, such as mobile phones, personal digital assistants (PDAs), and key fobs. For example, when a customer is offering a prepaid card (e.g., a store gift card) as payment for goods, prepaid card identification information may be entered into POS terminal 44, which generates and transmits authorization request message 50 to transaction processor 40. Transaction processor 40 may access a company database (not shown in FIG. 1) to determine a balance remaining on the prepaid card, and return authorization response message 56. In some examples, no bank and/or financial institution is involved in authorizing the electronic payment transaction. In another example, when a customer is offering a credit card or debit card as payment for goods, transaction processor 40 may be in communication with one or more banks and/or financial institutions (e.g., card issuer 30) to obtain authorization response message 54, from which authorization response message 56 is generated.

Figure 2:
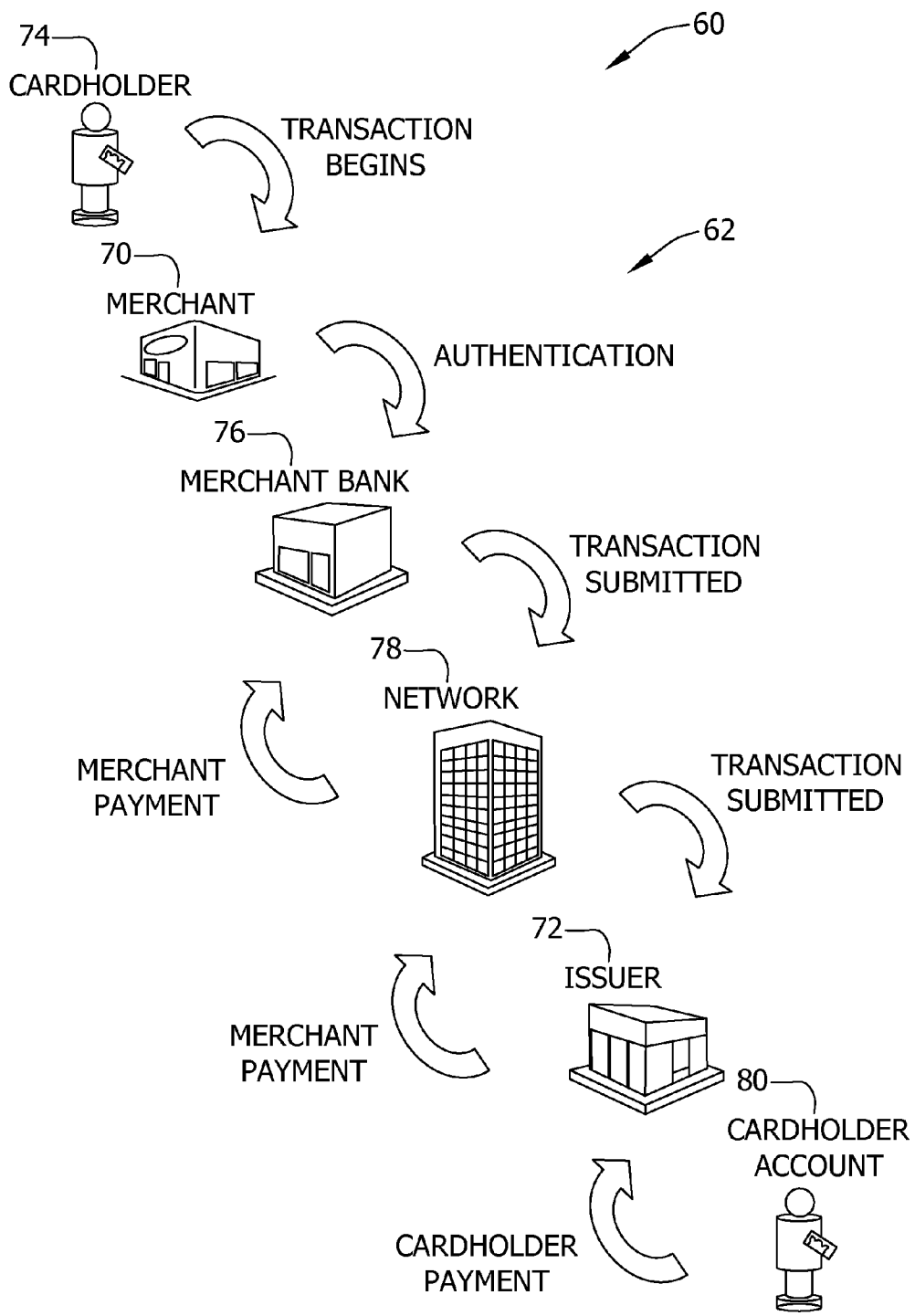

FIG. 2 is a schematic diagram 60 illustrating an exemplary multi-party payment card industry system 62 for enabling ordinary payment-by-card transactions in which a merchant 70 and a card issuer 72 do not necessarily have a one-on-one relationship. The methods and systems described herein relate to a payment card system, such as a credit card payment system using the MasterCard® interchange. The MasterCard® interchange is a proprietary communications standard promulgated by MasterCard International Incorporated® for the exchange of financial transaction data between financial institutions that are members of MasterCard International Incorporated®. (MasterCard is a registered trademark of MasterCard International Incorporated located in Purchase, N.Y., U.S.A.).

In a typical multi-party payment card system, a financial institution called the "issuer" 72 issues a payment card, such as a credit card, to a cardholder 74, who uses the payment card to tender payment for a purchase from merchant 70. To accept payment with the payment card, merchant 70 must normally establish an account with a financial institution that is part of the financial payment system. This financial institution is usually called the "merchant bank" 76 or the "acquiring bank" or "acquirer bank." When cardholder 74 tenders payment for a purchase with the payment card, merchant 70 requests authorization from merchant bank 76 for the amount of the purchase. The request may be performed over telephone 46 (shown in FIG. 1), but is usually performed through the use of POS terminal 44 (shown in FIG. 1). POS terminal 44 reads the payment card identification information from, for example, a magnetic stripe on the payment card or a wireless device within the payment card, and communicates electronically with the transaction processing computers of merchant bank 76. Alternatively, merchant bank 76 may authorize a third party (not shown in FIG. 2) to perform transaction processing on its behalf. In this case, the POS terminal 44 will be configured to communicate with the third party. Such a third party is usually called a "merchant processor" or an "acquiring processor."

Using an interchange network 78, the computers of merchant bank 76 or the merchant processor will communicate with the computers of issuer bank 72 to determine whether the cardholder's account is in good standing and whether the purchase is covered by the cardholder's available credit line. Based on these determinations, the request for authorization will be declined or accepted. If the request for authorization is accepted, an authorization code is issued to merchant 70 via an authorization response message.

In the case of a credit card, when a request for authorization is accepted, the available credit line of cardholder's account 80 is decreased. Normally, a charge is not posted immediately to the cardholder's account because bankcard associations, such as MasterCard International Incorporated®, have promulgated rules that do not allow merchant 70 to charge, or "capture," a transaction until goods are shipped or services are delivered. When merchant 70 ships or delivers the goods or services, merchant 70 captures the transaction by, for example, appropriate data entry procedures on POS terminal 44. If the cardholder cancels a transaction before it is captured, a "void" is generated. If the cardholder returns goods after the transaction has been captured, a "credit" is generated.

In the case of a prepaid card, when a request for authorization is accepted, an available balance remaining on the prepaid card may be immediately reduced by the authorized purchase amount.

For debit card transactions, when a request for a personal identification number (PIN) authorization is approved by issuer 72, the balance of the cardholder's account is decreased. Typically, a charge is posted immediately to a cardholder's account. The bankcard association then transmits the approval to the acquiring processor for distribution of goods/services, or information or cash in the case of an automated teller machine (ATM).

After an electronic payment transaction is captured, the transaction is settled between merchant 70, merchant bank 76, and issuer 72. Settlement refers to the transfer of financial data or funds between a transaction account of merchant 70, merchant bank 76, and issuer 72 related to the transaction. Usually, transactions are captured and accumulated into a "batch," which are settled as a group.

As described above, a payment card may be associated with a loyalty program that offers cardholder 74 an incentive to use that payment card. In some examples of loyalty programs, the loyalty program may be offered and implemented by merchant 70. For example, merchant 70 may issue a store payment card to cardholder 74 and agree that when cardholder 74 charges one-thousand dollars on the payment card, cardholder 74 will receive one-hundred loyalty points from merchant 70. Those loyalty points may then be used for prizes or discounts on other purchases. In other examples, issuer 72 may issue a payment card to cardholder 74 and agree that cardholder 74 will receive a payment reward equal to a percentage of the amount of every purchase cardholder 74 places on the payment card in return for using the payment card. More specifically, issuer 72 monitors a total cost of the purchases that cardholder 74 pays for using the payment card, and determines the amount of money cardholder 74 will be credited as the payment reward. Typically, the loyalty program information, for example, a total number of loyalty points and/or a loyalty program balance, are provided to cardholder 74 as part of a monthly statement or bill. The loyalty program information may also be accessed by cardholder 74 through a merchant and/or issuer website.

Figure 3:
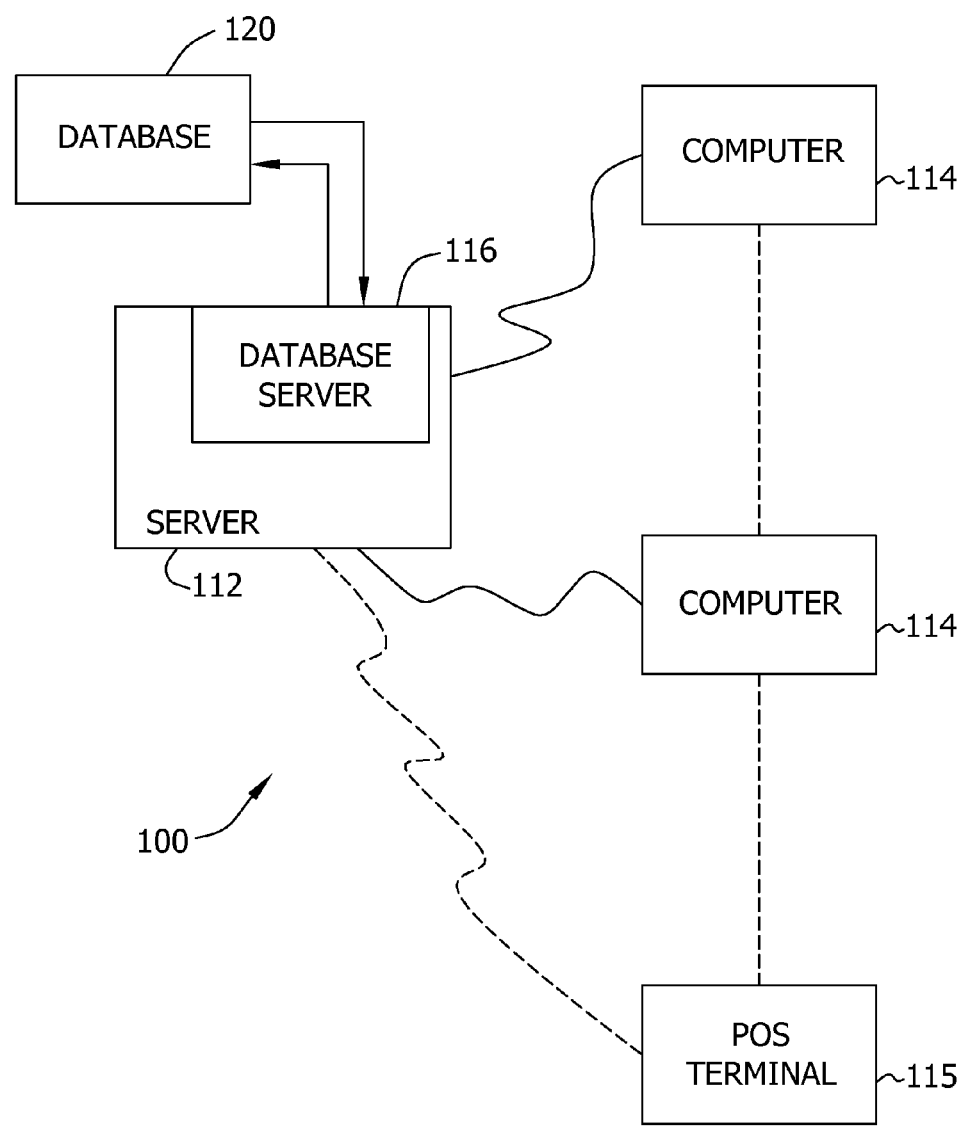

FIG. 3 is a simplified block diagram of an exemplary embodiment of a payment card system 100 for processing payment-by-card transactions. Payment card system 100 may be utilized by account holders as part of a process of initiating an authorization request and transaction, as well as a loyalty program update request, as described below.

More specifically, in the example embodiment, system 100 includes a server system 112, and a plurality of client subsystems, also referred to as client systems 114, connected to server system 112. In one embodiment, client systems 114 are computers including a web browser, such that server system 112 is accessible to client systems 114 using the Internet. Client systems 114 may be interconnected to the Internet through a variety of interfaces including a network, such as a local area network (LAN) or a wide area network (WAN), dial-in-connections, cable modems and special high-speed ISDN lines. Client systems 114 could be any device capable of interconnecting to the Internet including a web-based phone, personal digital assistant (PDA), or other web-based connectable equipment.

System 100 also includes a point-of-sale (POS) terminal 115, which is connected to client systems 114 and may be connected to server system 112. POS terminal 115 may be interconnected to the Internet through a variety of interfaces including a network, such as a local area network (LAN) or a wide area network (WAN), dial-in connections, cable modems, wireless modems, cellular communications, and special high-speed ISDN lines. POS terminal 115 may be any device capable of interconnecting to the Internet and of reading information from a consumer's financial transaction card. Although illustrated as including one POS terminal 115, system 100 may include any number of POS terminals and operate as described herein.

A database server 116 is connected to database 120, which contains information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized. Database 120 may store transaction data generated as part of sales activities conducted over the payment card system 100 including data relating to merchants, account holders or customers, and purchases. Database 120 may also store data relating to a list of merchants, for example, merchant 70 (shown in FIG. 2), and corresponding merchant identifiers of merchants participating in co-brand programs with an interchange network, for example, interchange network 78 (shown in FIG. 2). Database 120 may also store a list of product codes, and various information describing the subject of a transaction, such as identifying characteristics of the subject, financing terms for the subject, a size of the subject, and a per unit price of the subject.

In the exemplary embodiment, one of client systems 114 may be associated with an acquirer, for example, merchant bank 76 (shown in FIG. 2), while another one of client systems 114 may be associated with an issuer, for example, issuer 72 (shown in FIG. 2). Furthermore, POS terminal 115 may be associated with merchant 70, and server system 112 may be associated with interchange network 78.

Figure 4:
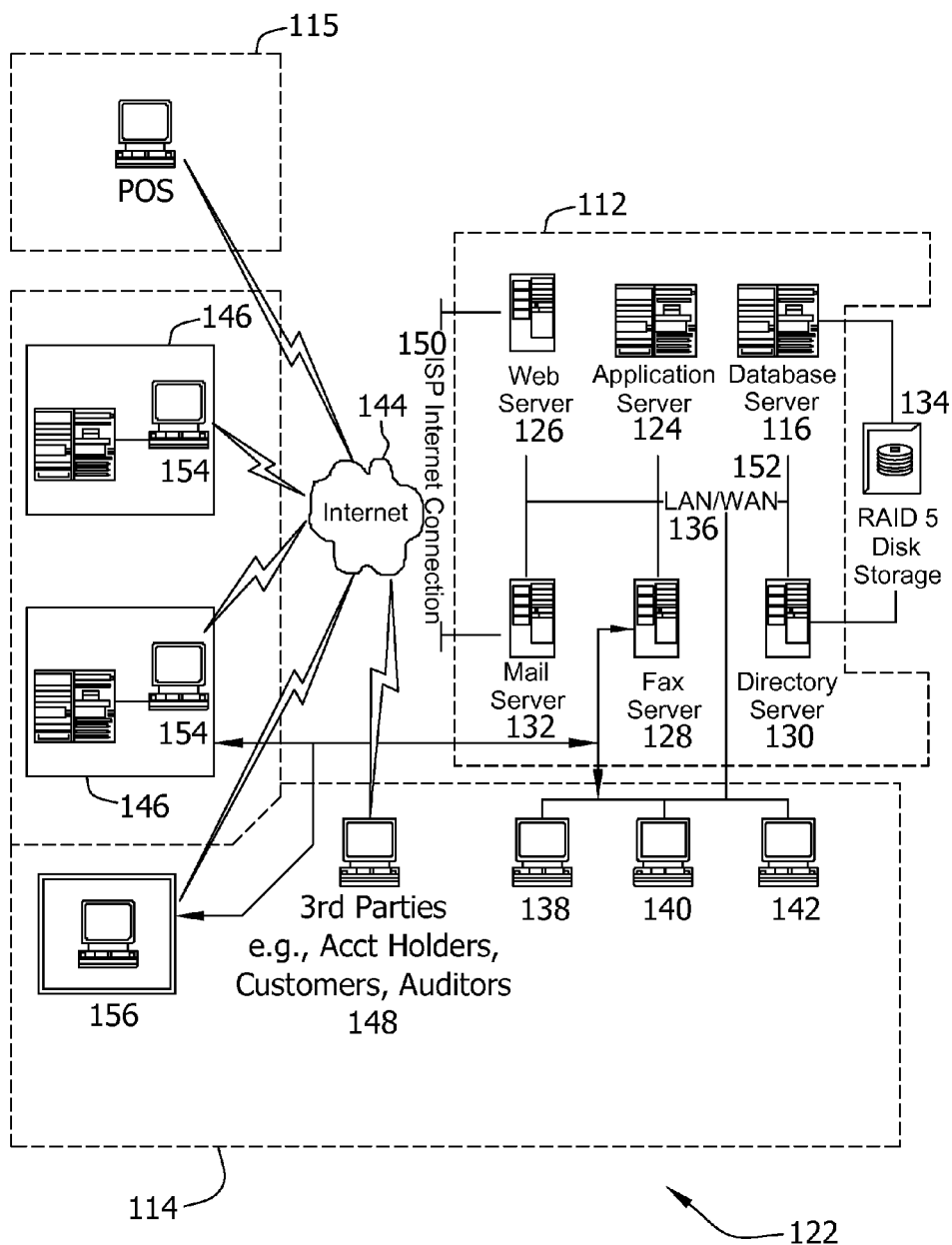

FIG. 4 is an expanded block diagram of an exemplary embodiment of a server architecture of a payment card system 122 for processing payment-by-card transactions. Components in system 122, identical to components of system 100 (shown in FIG. 3), are identified in FIG. 4 using the same reference numerals as used in FIG. 3. System 122 includes server system 112, client systems 114, and POS terminal 115. Server system 112 further includes database server 116, an application server 124, a web server 126, a fax server 128, a directory server 130, and a mail server 132. A disk storage unit 134 (i.e., a storage device) is coupled to database server 116 and directory server 130. Disk storage unit 134 may be configured to store a database, for example, database 120 (shown in FIG. 3). Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136, for example, using an Internet 144 link or are connected through an Intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 146 and to third parties, e.g., account holders, customers, auditors, etc., 148 using an ISP Internet connection 150. The communication in the exemplary embodiment is illustrated as being performed using Internet 144, however, any other wide area network (WAN) type communication can be utilized in other embodiments, i.e., the systems and processes are not limited to being practiced using Internet 144. In addition, and rather than WAN 152, local area network 136 could be used in place of WAN 152.

In the exemplary embodiment, any authorized individual having a workstation 154 can access system 122. At least one of the client systems includes a manager workstation 156 located at a remote location. In the exemplary embodiment, workstations 154 and 156 are personal computers having a web browser. Also, workstations 154 and 156 are configured to communicate with server system 112. Furthermore, fax server 128 communicates with remotely located client systems, including client system 114 using a telephone link. Fax server 128 is configured to communicate with other workstations 138, 140, and 142 as well.

As used herein, the terms "software" and "firmware" are interchangeable, and include any computer program stored in memory for execution by personal computers, workstations, clients and servers, including RAM memory, ROM memory, EPROM memory, EEPROM memory, and non-volatile RAM (NVRAM) memory. The above memory types are exemplary only, and are thus not limiting as to the types of memory usable for storage of a computer program.

Figure 5:
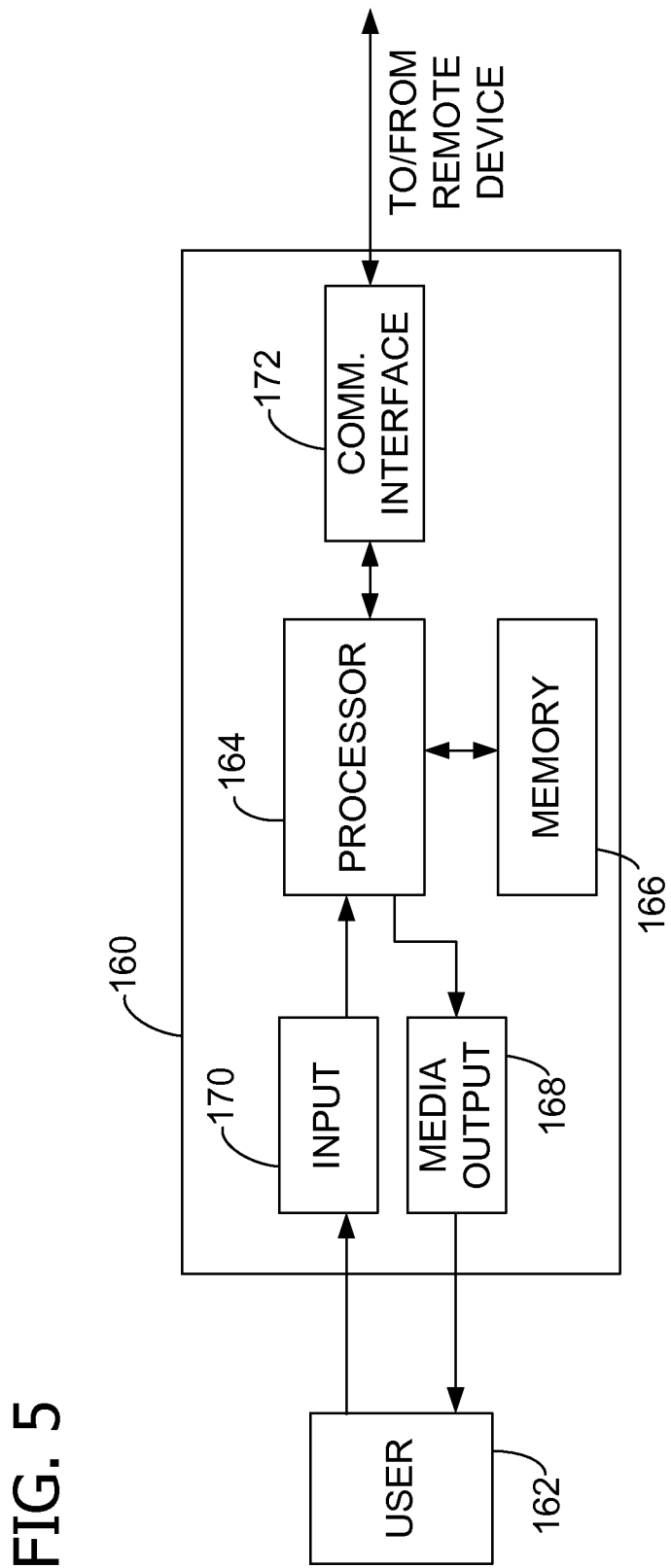

FIG. 5 illustrates an exemplary configuration of a user computing device 160 operated by a user 162. User computing device 160 may include, but is not limited to, client systems 114, 138, 140, and 142, POS terminal 115, workstation 154, and manager workstation 156 (shown in FIG. 4).

User computing device 160 includes a processor 164 for executing instructions. In some embodiments, executable instructions are stored in a memory area 166. Processor 164 may include one or more processing units (e.g., in a multi-core configuration). Memory area 166 is any device allowing information such as executable instructions and/or written works to be stored and retrieved. Memory area 166 may include one or more computer readable media.

User computing device 160 also includes at least one media output component 168 for presenting information to user 162. Media output component 168 is any component capable of conveying information to user 162. In some embodiments, media output component 168 includes an output adapter such as a video adapter and/or an audio adapter. An output adapter is operatively coupled to processor 164 and operatively couplable to an output device such as a display device (e.g., a liquid crystal display (LCD), organic light emitting diode (OLED) display, or "electronic ink" display) or an audio output device (e.g., a speaker or headphones).

In some embodiments, user computing device 160 includes an input device 170 for receiving input from user 162. Input device 170 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 168 and input device 170.

User computing device 160 may also include a communication interface 172, which is communicatively couplable to a remote device such as server system 112 (shown in FIG. 4). Communication interface 172 may include, for example, a wired or wireless network adapter or a wireless data transceiver for use with a mobile phone network (e.g., Global System for Mobile communications (GSM), 3G) or other mobile data network (e.g., Worldwide Interoperability for Microwave Access (WIMAX)).

Stored in memory area 166 are, for example, computer readable instructions for providing a user interface to user 162 via media output component 168 and, optionally, receiving and processing input from input device 170. A user interface may include, among other possibilities, a web browser and client application. Web browsers enable users, such as user 162, to display and interact with media and other information typically embedded on a web page or a website from server system 112. A client application allows user 162 to interact with a server application from server system 112.

Figure 6:
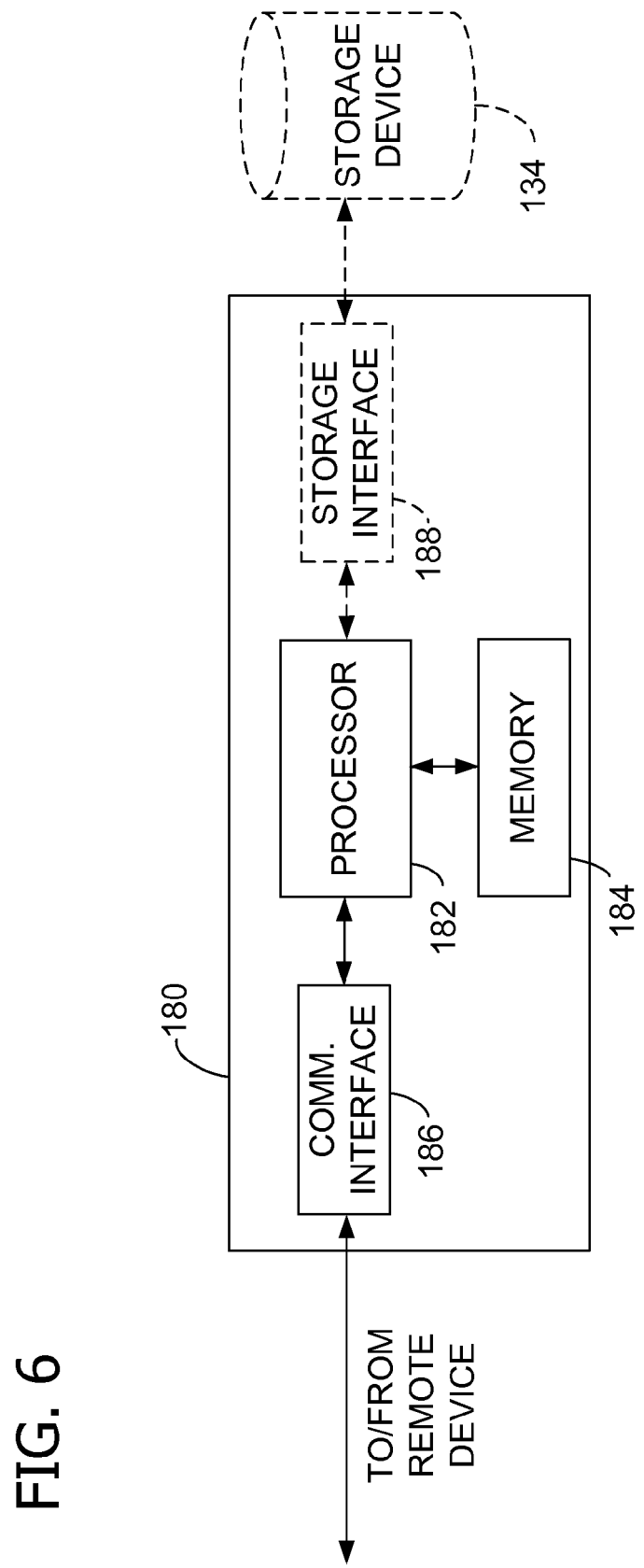

FIG. 6 illustrates an exemplary configuration of a server computing device 180 such as server system 112 (shown in FIG. 4). Server computing device 180 may include, but is not limited to, database server 116, application server 124, web server 126, fax server 128, directory server 130, and mail server 132.

Server computing device 180 also includes a processor 182 for executing instructions. Instructions may be stored in a memory area 184, for example. Processor 182 may include one or more processing units (e.g., in a multi-core configuration).

Processor 182 is operatively coupled to a communication interface 186 such that server computing device 180 is capable of communicating with a remote device such as user computing device 160 (shown in FIG. 5) or another server computing device 180. For example, communication interface 186 may receive requests from client system 114 via the Internet, as illustrated in FIG. 4.

Processor 182 may also be operatively coupled to storage device 134. Storage device 134 is any computer-operated hardware suitable for storing and/or retrieving data. In some embodiments, storage device 134 is integrated in server computing device 180. For example, server computing device 180 may include one or more hard disk drives as storage device 134. In other embodiments, storage device 134 is external to server computing device 180 and may be accessed by a plurality of server computing devices 180. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 182 is operatively coupled to storage device 134 via a storage interface 188. Storage interface 188 is any component capable of providing processor 182 with access to storage device 134. Storage interface 188 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 182 with access to storage device 134.

Figure 7:
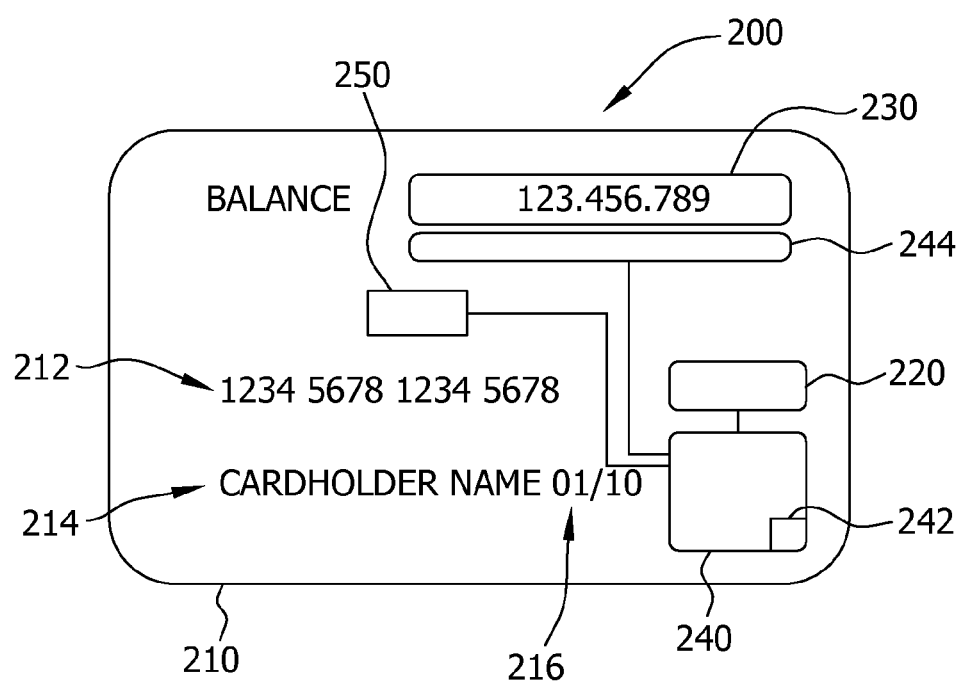

FIG. 7 is an illustration of an exemplary payment card 200 for use by a customer as part of an electronic payment transaction. For example, payment card 200 may be used as part of the closed-loop payment card authorization system 10 (shown in FIG. 1) and/or as part of multi-party payment card system 62 (shown in FIG. 2), as well as other variations of payment card transaction systems. In the exemplary embodiment, payment card 200 includes a flexible body 210. Typically, flexible body 210 is sized according to a standard, for example, standards promulgated by the International Organization for Standardization (ISO) and the International Electrotechnical Commission (IEC). More specifically, ISO/IEC 7810:2003 ID-1 specifies a size for payment cards of 85.60 mm by 53.98 mm. Additionally, ISO/IEC 7813 specifies that an ID-1 compliant payment card have a thickness of 0.76 mm and corners rounded with a radius of 3.18 mm. Although the ISO/IEC defines a standard size for payment cards, it is to be understood that the methods and systems described herein may be performed with a payment card of any shape or size that allows payment card 200 to interact with POS terminal 115 (shown in FIG. 3) as described herein. Flexible body 210 may include indicia, for example, but not limited to, a payment card account number 212, a customer account name 214, and an expiration date 216, displayed on flexible body 210 and/or embossed within flexible body 210.

In the exemplary embodiment, payment card 200 includes a wireless communication device 220, a digital display screen 230, and a processing device 240. In the exemplary embodiment, wireless communication device 220, digital display screen 230, and processing device 240 are at least partially sealed within flexible body 210. In the exemplary embodiment, processing device 240 is coupled to wireless communication device 220. In an alternative embodiment, wireless communication device 220 is included within processing device 240. Furthermore, processing device 240 may also include a memory unit 242, or alternatively, may be coupled to memory unit 242. The term processing device or processor, as used herein, refers to central processing units, microprocessors, microcontrollers, reduced instruction set circuits (RISC), application specific integrated circuits (ASIC), logic circuits, and any other circuit or processor capable of executing the functions described herein.

In the exemplary embodiment, digital display screen 230 is coupled to processing device 240. In the exemplary embodiment, digital display screen 230 is a light emitting diode (LED) display screen, an organic light emitting diode (OLED) display screen, or any other suitable type of display screen that enables payment card 200 to function as described herein. In the exemplary embodiment, processing device 240 provides digital display screen 230 with a signal, which is converted to a visual display by digital display screen 230. Payment card 200 may also include a power source 250 included within flexible body 210. Power source 250 may be coupled to wireless communication device 220, digital display screen 230, and/or processing device 240. In an exemplary embodiment, power source 250 is a battery. In an alternative embodiment, power source 250 is a capacitive storage device, although, power source 250 may be any suitable power source that is able to provide power to payment card 200 so payment card 200 can function as described herein. In some alternative embodiments, payment card 200 may include multiple digital display screens, for example, first digital display screen 230 and a second digital display screen 244. Multiple display screens 230 and 244 may facilitate displaying more data than a single display screen.

As described above, payment card data may be provided to a POS terminal, for example, POS terminal 44, through the use of a wireless system. Wireless communication device 220 may be included within a radio frequency identification (RFID) communication system, a cellular communication system, a Bluetooth® communication system, or any other suitable communication system that allows payment card 200 to function as described herein. In the exemplary embodiment, wireless communication device 220 of payment card 200 is an RFID device. RFID device 220 may be included as a portion of an RFID communication system (not shown in FIG. 7). At least some known RFID communication systems include a transponder (i.e., RFID device 220) and a transceiver with a decoder, or a reader (described further below with respect to FIG. 8). The transponder typically includes a radio frequency (RF) integrated circuit, and an antenna positioned on a substrate, for example, flexible body 210. The antenna wirelessly receives RF energy from the reader and transmits the data encoded in the received RF energy to the RF integrated circuit.

RF readers utilize an antenna as well as a transceiver and decoder. In certain embodiments, when RFID device 220 passes through an electromagnetic zone of a reader, RFID device 220 is activated by the signal from the antenna. The reader decodes the data on the transponder and this decoded information is forwarded to a host computer for processing. In an exemplary embodiment, a reader, also referred to as an interrogator, is included within POS terminal 115 (shown in FIG. 3).

Several different types of transponders are utilized in RFID systems, including passive, semi-passive, and active transponders. Each type of transponder may be read only or read/write capable. Passive transponders obtain operating power from the RF signal of the reader that interrogates the transponder. Semi-passive and active transponders are powered by a battery, which generally results in a greater read range. Semi-passive transponders may operate on a timer and periodically transmit information to the reader. Transponders may also be activated when they are read or interrogated by a reader. Active transponders can initiate communication, whereas passive and semi-passive transponders are activated only when they are read by another device first.

Figure 8:
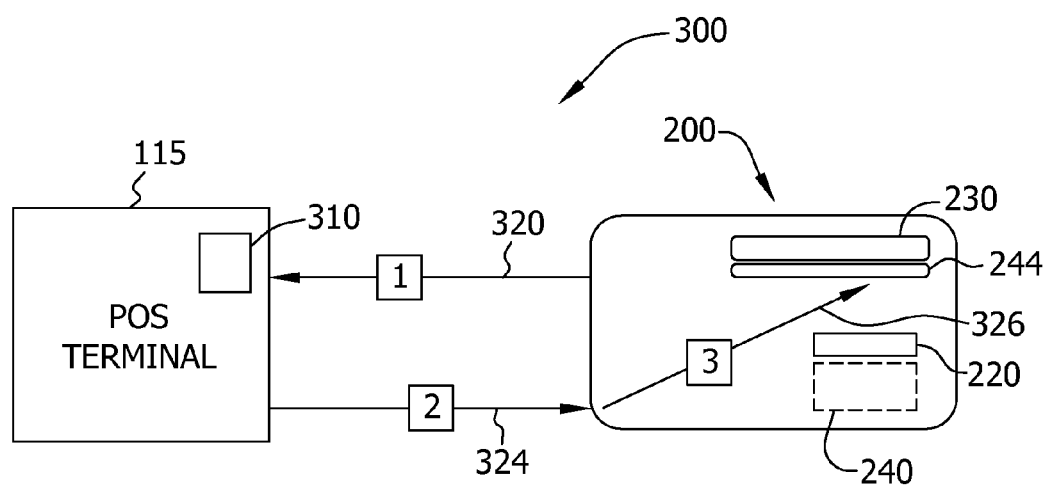

FIG. 8 is a data flow diagram 300 illustrating data communication between payment card 200 (shown in FIG. 7) and POS terminal 115 (shown in FIG. 3). More specifically, data flow diagram 300 illustrates data flow between merchant POS terminal 115 and a payment card, for example, payment card 200 of a cardholder such as one discussed in FIG. 1 or cardholder 74 (shown in FIG. 2). In the exemplary embodiment, POS terminal 115 includes a reader 310, for example, an RFID reader. Although described herein as an RFID reader, reader 310 may include a cellular receiver, a magnetic stripe reader, or any other type of device that allows payment card information to be entered into POS terminal 115. In the exemplary embodiment, when payment card 200 is positioned within a predetermined distance from POS terminal 115, power from reader 310 energizes RFID device 220. In response, RFID device 220 transmits 320 a signal to reader 310 that includes payment card identification information.

Payment card identification information may include, but is not limited to, a customer account number, a unique identifier, a cardholder's identification data, and an issuing bank's identification data. POS terminal 115 functions as described above and requests an authorization for a purchase entered into POS terminal 115 by, for example, merchant 70 (shown in FIG. 2). In addition, POS terminal 115 transmits 324 loyalty program data to payment card 200, which is provided 326 to digital display screen 230 for display. In an alternative embodiment, POS terminal 115 also transmits 324 an account identifier to payment card 200. The account identifier uniquely identifies the cardholder's account. Processing device 240 compares the account identifier to stored data to prevent loyalty program data associated with another account from being displayed on digital display screen 230.

Loyalty program data includes data that may be of interest to a cardholder. Various scenarios exist in the payment-by-card industry today, where the card issuer has a special or customized relationship with a specific merchant, or group of merchants. These special or customized relationships may, for example, include private label programs, co-brand programs, proprietary card brands, rewards programs, and others. These special or customized relationships may also be referred to as loyalty programs that typically involve the award of loyalty points to a cardholder based upon certain incentivized actions taken by the cardholder, such as the purchase of a certain value of goods or services from a particular merchant. Loyalty points may be referred to by a particular loyalty program as "rewards points," "rewards dollars," "rewards miles," or other descriptive names. The cardholder then has the option of redeeming his or her accumulated loyalty points according to loyalty program rules to obtain better terms for a later transaction. The costs of providing such loyalty program incentives to the cardholder may be borne solely by the issuer, jointly by the issuer and a merchant or third party, or solely by a merchant or third party, depending upon the type and sponsorship of the loyalty program. The methods and systems described herein provide an attractive differentiation from other payment cards and payment card systems by immediately providing loyalty program information during and/or after purchases via a digital display screen, for example digital display screen 230. Since many cardholders have several payment cards in their wallets or purses, the methods and systems described herein may catch the eye of the cardholder and provide the cardholder with a reason to use payment card 200 rather than another payment card.

In one embodiment, loyalty points are updated and displayed on payment card 200 after a purchase is authorized. For example, card issuer 30 (shown in FIG. 1) may include loyalty points update data in authorization response message 54, which is then provided for display on payment card 200. The loyalty points may be displayed on digital display screen 230 for a predetermined length of time, or until the next time the loyalty points are updated. In another embodiment, loyalty points are displayed on digital display screen 230 prior to a payment transaction, upon a loyalty points update request. Updating the loyalty points displayed on digital display screen 230 may influence a cardholder's use of the payment card, for example, by providing a visual incentive for using the payment card and also by facilitating the use of the loyalty points accumulated by the cardholder.

FIG. 9 is a flow diagram 400 illustrating an exemplary method 402 for displaying loyalty program information on a payment card, for example, payment card 200 (shown in FIG. 7). In the exemplary embodiment, method 402 includes storing 404 cardholder account information in a database, for example, database 120 (shown in FIG. 3). The cardholder account information may include, but is not limited to including, an issuing bank, a current balance, an available balance, loyalty program enrollment data, and a loyalty program balance associated with each issued payment card. The cardholder account information is associated with at least one payment card, for example, payment card 200. The cardholder account information may include information related to pending transactions as well as cleared transactions.

In the exemplary embodiment, method 402 also includes presenting 406 a payment card for use in an electronic payment card transaction (e.g., an electronic payment for goods or services and/or a request for loyalty program information). For example, cardholder 74 (shown in FIG. 2) may present 406 payment card 200 to merchant 70 and request an update on their loyalty program balance. Method 402 also includes reading 408 payment card identification information from payment card 200. For example, merchant 70 may manually enter payment card identification information, or automatically read payment card identification information from payment card 200 using, for example, POS terminal 115 (shown in FIG. 3).

In the exemplary embodiment, method 402 includes receiving 410 a loyalty program request message. For example, the loyalty program request message may be sent from POS terminal 115 to server 112. In an exemplary embodiment, the loyalty program request message includes the payment card identification data associated with payment card 200. For example, server 112 (shown in FIG. 3) may receive payment card identification data read from payment card 200. As described above, payment card identification data links the payment card to cardholder account information stored in database 120. The payment card identification data may include, for example, an account number, a unique identifier, a cardholder's identification data, and/or an issuing bank's identification data.

In the exemplary embodiment, in addition to the payment card identification data, electronic payment transaction data is also received 412 at server 112 after being sent from POS terminal 115. For example, after deciding to make a purchase at merchant 70, cardholder 74 may present 406 payment card 200 to merchant 70 as payment for the purchase. Electronic payment transaction data may include merchant identification data, a requested transaction payment amount, and/or data descriptive of the merchandise being purchased. In other words, POS terminal 115 may transmit the payment card identification data and the electronic payment transaction data to server 112. The combination of payment card identification data and electronic payment transaction data may also be referred to as an electronic payment authorization request message, for example, authorization request message 50 (shown in FIG. 1).

In the exemplary embodiment, method 402 also includes processing 414 electronic payment authorization request message 50. In the exemplary embodiment, server 112 processes 414 authorization request message 50 received from merchant 70 and determines an authorization response. The authorization response includes one of a payment acceptance and a payment denial, which is included within an authorization response message, for example, authorization response message 54 (shown in FIG. 1). For example, when a credit card is offered as payment for a product or service, server 112 determines if the cardholder account associated with the credit card has an available credit limit high enough to cover the requested electronic payment. When a debit card or pre-paid card is offered as payment for a product or service, server 112 determines if the cardholder account associated with the payment card has a remaining balance high enough to pay for the product or service. Server 112 generates authorization response message 54 in accordance with these determinations.

In the exemplary embodiment, method 402 also includes determining 416 whether the offered payment card is associated with a loyalty program. As described above, the cardholder may be enrolled in a loyalty program wherein incentives are provided to the cardholder for using payment card 200. In the exemplary embodiment, the loyalty program that the cardholder is enrolled in awards loyalty points. In the exemplary embodiment, loyalty program enrollment data is a type of account information that is stored in database 120. In the exemplary embodiment, the loyalty program request message includes an indicator, for example, an indicator flag and/or data within a particular field. The presence of the indicator informs server 112 that payment card 200 may be registered in a loyalty program. Server 112 accesses the cardholder account information stored in database 120 to determine 416 loyalty program enrollment. In the exemplary embodiment, method 402 also includes determining 418 loyalty program update data. The loyalty program update data may include a current loyalty program balance stored in database 120. Alternatively, the loyalty program update data may also be based at least partially on the electronic payment transaction data. For example, server 112 may determine 418 whether the electronic payment transaction qualifies for loyalty program benefits based at least partially on the electronic payment transaction data.

As described above, loyalty programs often reward cardholders for making qualified purchases using a specific payment card. The definition of a qualified purchase may include, for example, a purchase from a specific merchant and/or a purchase of a specific type of goods. For example, a loyalty program may reward a cardholder whenever the cardholder makes a purchase from Merchant A using the corresponding payment card. The cardholder is able to use the payment card at merchants other than Merchant A, but the cardholder will not receive loyalty points based on those purchases. In this example, server 112 may determine if the purchase included within the authorization request message qualifies for loyalty points. More specifically, server 112 determines that loyalty points will be awarded if the authorization request message is received from Merchant A.

In an alternative embodiment, a loyalty program may reward a cardholder based upon what is being purchased. For example, loyalty points may be awarded when a cardholder uses the payment card to purchase medical supplies. The cardholder is able to use the payment card to purchase goods and services other than medical supplies, however, the cardholder will only receive loyalty points based on purchases of medical supplies. Upon authorization of an electronic payment transaction, loyalty points for the cardholder may be increased and updated based on the approved amount of the qualified electronic purchases. More specifically, if the authorization request message is approved, and the purchase qualifies for the loyalty program associated with payment card 200, server 112 determines 418 loyalty program update data. For example, server 112 may determine 418 a number of available loyalty points, a loyalty program available balance, a loyalty program balance prior to the instant electronic payment transaction, and/or a loyalty program balance subsequent to the instant electronic payment transaction. In the exemplary embodiment, card issuer 72 (shown in FIG. 2) determines 418 loyalty program update data. In alternative embodiments, depending on which entity maintains the loyalty rewards program, merchant bank 76 and/or interchange network 78 may determine 418 loyalty program update data.

In the exemplary embodiment, method 402 also includes generating 420 a loyalty program response message. The loyalty program response message includes the loyalty program update data. The loyalty program response message may be included within an electronic payment authorization response message, for example, authorization response message 54 (shown in FIG. 1). The electronic payment authorization response message 54 also includes either a payment authorization or a payment denial. Method 402 may also include transmitting 422 the loyalty program update data to payment card 200 for display as loyalty program information on a payment card display, for example, payment card display screen 230 (shown in FIG. 7). In the exemplary embodiment, the loyalty program update data is transmitted from server 112 to POS terminal 115, and from POS terminal 115 to payment card 200 for display as loyalty program update information on payment card display screen 230. In an exemplary embodiment, POS terminal 115 indicates to the cardholder that loyalty program update data is available, and requests that the cardholder present the payment card in order to receive the loyalty program update data. As described above, data may be transmitted between POS terminal 115 and payment card 200 using a wireless system. Once the loyalty program update data is received by payment card 200, the loyalty program update information is displayed on display screen 230.

In the exemplary embodiment described above, server 112 is described as performing many steps of method 402. In the exemplary embodiment, server 112 is associated with issuer 72 (shown in FIG. 2). In alternative embodiments, server 112 is associated with interchange network 78, merchant bank 76, or any other party involved in multi-party payment card industry system 62 (shown in FIG. 2). Furthermore, various steps of method 402 may be performed by different parties. For example, issuer 72 may process 414 an electronic payment authorization request message and transmit an electronic payment authorization response message to interchange network 78. Interchange network 78 may then determine 418 loyalty program update data based at least partially on the electronic payment authorization response message. In other alternative embodiments, server 112 is associated with transaction processor 40 (shown in FIG. 1), or any other party involved in a closed-loop payment card authorization system, such as, payment card authorization system 10 (shown in FIG. 1).

In the exemplary embodiment, the loyalty program update information displayed on payment card digital display screen 230 includes a total balance of loyalty points accumulated by the cardholder. In an alternative embodiment, display screen 230 is capable of displaying more than one value corresponding to loyalty program update information. Alternatively, payment card 200 may include more than one display screen, for example, display screens 230 and 244 (shown in FIG. 7). In the alternative embodiment, display screen 230 is configured to display a previously cleared loyalty point total and display screen 244 is configured to display a number of loyalty points earned after completing the current transaction. By displaying more than one value, more information can be presented to the cardholder.

In an alternative embodiment, method 402 may include providing 424 a loyalty program update request option to the cardholder via POS terminal 115. For example, POS terminal 115 may display a message instructing the cardholder to press a key on a POS terminal keypad if the cardholder would like to receive a loyalty program update. Method 402 also includes receiving 426, from POS terminal 115, the payment card identification data and a loyalty program update request signal at server 112. Upon selection of the loyalty program update request option, POS terminal 115 generates the loyalty program request message and transmits the payment card identification data and the loyalty program request message to server 112. For example, it may be beneficial to a cardholder to know a current number of loyalty points associated with their payment card prior to making a purchase. The methods and systems described herein facilitate providing loyalty program update data to a payment card for display on the payment card upon a cardholder request. In an exemplary embodiment, the cardholder presents 406 the payment card for use in an electronic payment transaction (e.g., a request for loyalty program information). The payment card identification data is read 408 by POS terminal 115 and the cardholder selects a loyalty program update request option provided 424 by POS terminal 115. The payment card identification data and the loyalty program request message are received 426 at, for example, server 112. As described above, server 112 then determines 416 whether the payment card is associated with a loyalty program and determines 418 loyalty program update data. The loyalty program update data is transmitted 422 to the payment card for display as loyalty program update data on the payment card digital display screen.

In another alternative embodiment, periodically or upon request, server 112 facilitates transmitting the loyalty program update data via long range communication, for example, but not limited to, cellular communications and radio transmissions, in order to update the information displayed on payment card 200.

In an alternative embodiment, method 402 may also include receiving 428 a loyalty balance usage signal. For example, a loyalty balance usage option may be presented to the cardholder via POS terminal 115. Upon selection by the cardholder and/or the merchant, a loyalty balance usage signal may be generated by POS terminal 115 and transmitted to, for example, server 112. The loyalty balance usage option allows the cardholder to immediately use stored loyalty program rewards, for example, to reduce the cost of the instant transaction. Server 112 may also determine 418 loyalty program update data based on the used loyalty points. More specifically, server 112 may reduce a loyalty program balance of the cardholder after the cardholder chooses to use some or all of the loyalty program balance. Server 112 may also generate 420 a loyalty program response message that includes the new, lower loyalty program balance.

Furthermore, data transmitted wirelessly using the methods and systems described herein is encrypted and conforms to a protocol that is consistent with capabilities of the payment card and the POS terminal. The encryption facilitates preventing communication between the payment card and a POS terminal that is either unknown to the cardholder or not approved by the cardholder.

As will be appreciated based on the foregoing specification, the above-described embodiments of the disclosure may be implemented using computer programming or engineering techniques including computer software, firmware, hardware or any combination or subset thereof, wherein the technical effect of the systems and processes described herein is achieved by creating a network-based system for displaying loyalty program information on a payment card. The technical effect is also achieved with a method for displaying loyalty program update information on the payment card. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of methods and system for displaying loyalty program update information on a payment card provide a cost-effective and reliable means for providing loyalty program update information to a cardholder. More specifically, the methods and systems described herein provide a cardholder with an up-to-date total of prepaid card balances and/or loyalty program information. Furthermore, the methods and systems described herein may facilitate increasing usage of the payment card by providing an attractive differentiation from other payment cards.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for displaying loyalty program information on a payment card, the payment card having a processing device coupled to at least one display screen, said method comprising:
receiving a loyalty program request message at a payment network, the loyalty program request message including payment card identification data associated with the payment card;
determining that the payment card is registered in a loyalty program based at least in part on the payment card identification data;
electronically generating a loyalty program response message that includes loyalty program update data; and
transmitting the loyalty program update data from the payment network to the payment card for displaying as loyalty program information on the at least one display screen.

2. A method in accordance with claim 1, wherein electronically generating the loyalty program response message further comprises determining, at the payment network, a reward point balance for the payment card, wherein the reward point balance includes a number of reward points available to be applied toward a purchase using the payment card.

3. A method in accordance with claim 1, wherein the payment network includes a payment computer in communication with a point-of-sale (POS) device, and wherein receiving a loyalty program request message further comprises receiving the loyalty program request message at the payment computer from the POS device.

4. A method in accordance with claim 3, further comprising wirelessly transmitting the payment card identification data from the payment card to the POS device.

5. A method in accordance with claim 4, wherein the payment card identification data is encrypted before it is transferred from the payment card to the POS device.

6. A method in accordance with claim 1, wherein receiving the loyalty program request message at the payment network further comprises receiving an authorization request message that includes transaction data, wherein the transaction data represents a transaction initiated by a cardholder using the payment card.

7. A method in accordance with claim 6 further comprising receiving, at the payment network, a loyalty program reward usage signal requesting that at least a portion of a reward point balance associated with the payment card be applied to the transaction initiated by the cardholder.

8. A network-based system for displaying loyalty program information on a payment card, the payment card having a processing device coupled to at least one display screen, said system comprising:
a memory device for storing loyalty data; and
a computer device in communication with the memory device, the computer device configured to:
receive a loyalty program request message including payment card identification data associated with the payment card;
determine that the payment card is registered in a loyalty program based at least in part on the payment card identification data;
electronically generate a loyalty program response message that includes loyalty program update data; and
transmit the loyalty program update data, directly or indirectly, to the payment card for displaying as loyalty program information on the at least one display screen.

9. A network-based system in accordance with claim 8, wherein the computer device is further configured to determine a reward point balance for the payment card, wherein the reward point balance includes a number of reward points available to be applied toward a purchase using the payment card.

10. A network-based system in accordance with claim 8, wherein the computer device is in communication with a point-of-sale (POS) device, and wherein the computer device is further configured to receive the loyalty program request message from the POS device after the payment card identification data is wirelessly transmitted from the payment card to the POS device.

11. A network-based system in accordance with claim 10, wherein the payment card identification data is encrypted before it is transferred from the payment card to the POS device.

12. A network-based system in accordance with claim 8, wherein the computer device is further configured to receive an authorization request message that includes transaction data from a POS device associated with a merchant, wherein the transaction data represents a transaction initiated by a cardholder using the payment card with the merchant.

13. A network-based system in accordance with claim 12, wherein the computer device is further configured to receive a loyalty program reward usage signal requesting that at least a portion of a reward point balance associated with the payment card be applied to the transaction initiated by the cardholder.

14. A payment card for use in an electronic payment transaction, said payment card comprising:
a display screen;
a processing device coupled to said display screen; and
a wireless communication device coupled to said processing device, said wireless communication device configured to transmit payment card identification data and to receive loyalty program update data,
wherein the payment card identification data is for processing the electronic payment transaction; and
wherein the loyalty program update data is output from said processing device for display on said display screen.

15. A payment card in accordance with claim 14, wherein said payment card further comprises multiple display screens.

16. A payment card in accordance with claim 15, wherein a first display screen is configured to display a previously cleared loyalty point total, and a second display screen is configured to display a number of loyalty points earned after completing the electronic payment transaction.

17. A payment card in accordance with claim 14, wherein said payment card identification data is transmitted along with a loyalty indicator, the loyalty indicator indicating that the payment card is associated with a loyalty program.

18. A payment card in accordance with claim 14, wherein said payment card is configured to display the loyalty program update data on the display screen for a predetermined length of time.

19. A payment card in accordance with claim 14, wherein said payment card is configured to display the loyalty program update data on the display screen until the loyalty program update data is updated.

20. A payment card in accordance with claim 14, wherein said wireless communication device uses encryption to transmit payment card identification data and to receive loyalty program update data.

* * * * *